Dec. 26, 1967   J. BELART   3,360,085
SELF-ADJUSTING FLUID-OPERATED BRAKE
Filed Sept. 12, 1966   3 Sheets-Sheet 1

Juan Belart
INVENTOR.

BY   Ross & Mestern

Juan Belart
INVENTOR.

BY Ross & Mestern

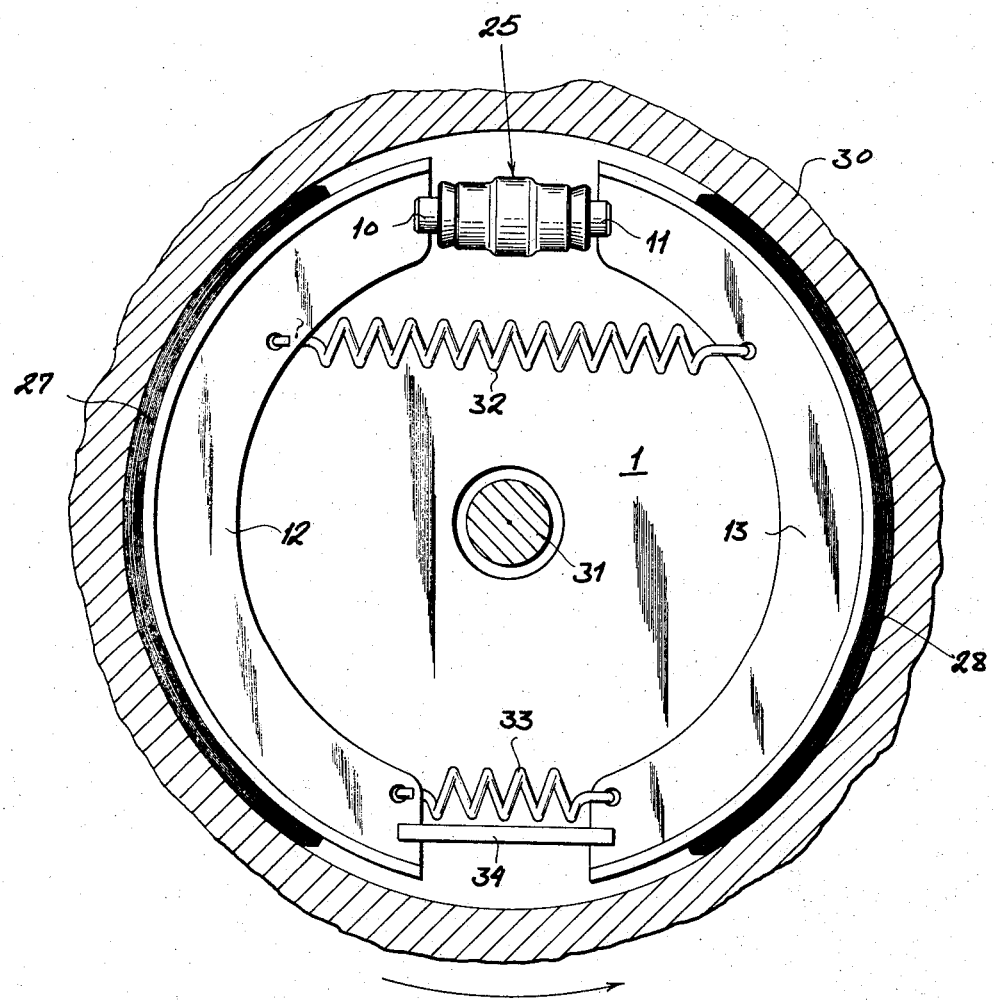

United States Patent Office 3,360,085
Patented Dec. 26, 1967

3,360,085
SELF-ADJUSTING FLUID-OPERATED BRAKE
Juan Belart, Walldorf, Germany, assignor to Alfred Teves Maschinen- und Armaturenfabrik KG, Frankfurt am Main, Germany, a corporation of Germany
Filed Sept. 12, 1966, Ser. No. 578,732
Claims priority, application Germany, Sept. 10, 1965, T 29,377
5 Claims. (Cl. 188—79.5)

My present invention relates to a self-adjusting fluid-operated (preferably hydraulic) brake of the type wherein a brake shoe is intermittently displaced against a co-operating surface, such as a brake drum on a vehicle wheel, through the intermediary of a pusher member whose effective length must be increased from time to time in order to compensate for the progressive wear of the brake-shoe lining.

The general object of this invention is to provide a brake of this type wherein the necessary compensating adjustment is automatically carried out by simple mechanical means.

This object is realized, in conformity with my present invention, by the provision of an extensible pusher assembly which comprises a hollow piston axially slidable in a guide cylinder, an internally threaded sleeve rotatably lodged in the piston so as to be axially entrainable by it, and an externally threaded stem in mesh with the sleeve, this stem bearing upon a brake shoe under pressure of a fluid-operated drive element acting upon the piston. The stem is held, e.g. by its engagement with the brake shoe, against rotation with reference to the cylinder so that rotation of the sleeve about its axis (which coincides with or is parallel to the cylinder axis) in a predetermined direction causes an axial outward displacement of the stem threadedly connected thereto. Such rotation can be imparted to the sleeve, pursuant to an important feature of my invention, by an elongated resilient pawl which occupies an annular clearance within the piston and has one end secured to the latter while engaging with its other end a sawtooth of a ratchet rigid with the sleeve, the pawl being in contact with a preferably ball-shaped pressure member which is seated in the piston and is cammed inwardly by a suitable formation on the cylinder so as to step the ratchet and the sleeve by at least one tooth in response to a piston motion exceeding a predetermined axial stroke length.

In general, a brake of the type herein contemplated will comprise two brake shoes each with its one pusher assembly as described above, the associated pistons being concurrently displaceable by a common drive element. Either or both of the two pusher assemblies may be adjustable by the construction described.

The above and other features of my invention will become more fully apparent from the following detailed description of a representative embodiment, reference being made to the accompanying drawing in which:

FIG. 3 is a face view of a vehicular brake incorporating the mechanism of FIGS. 1 and 2.

Figure 1:
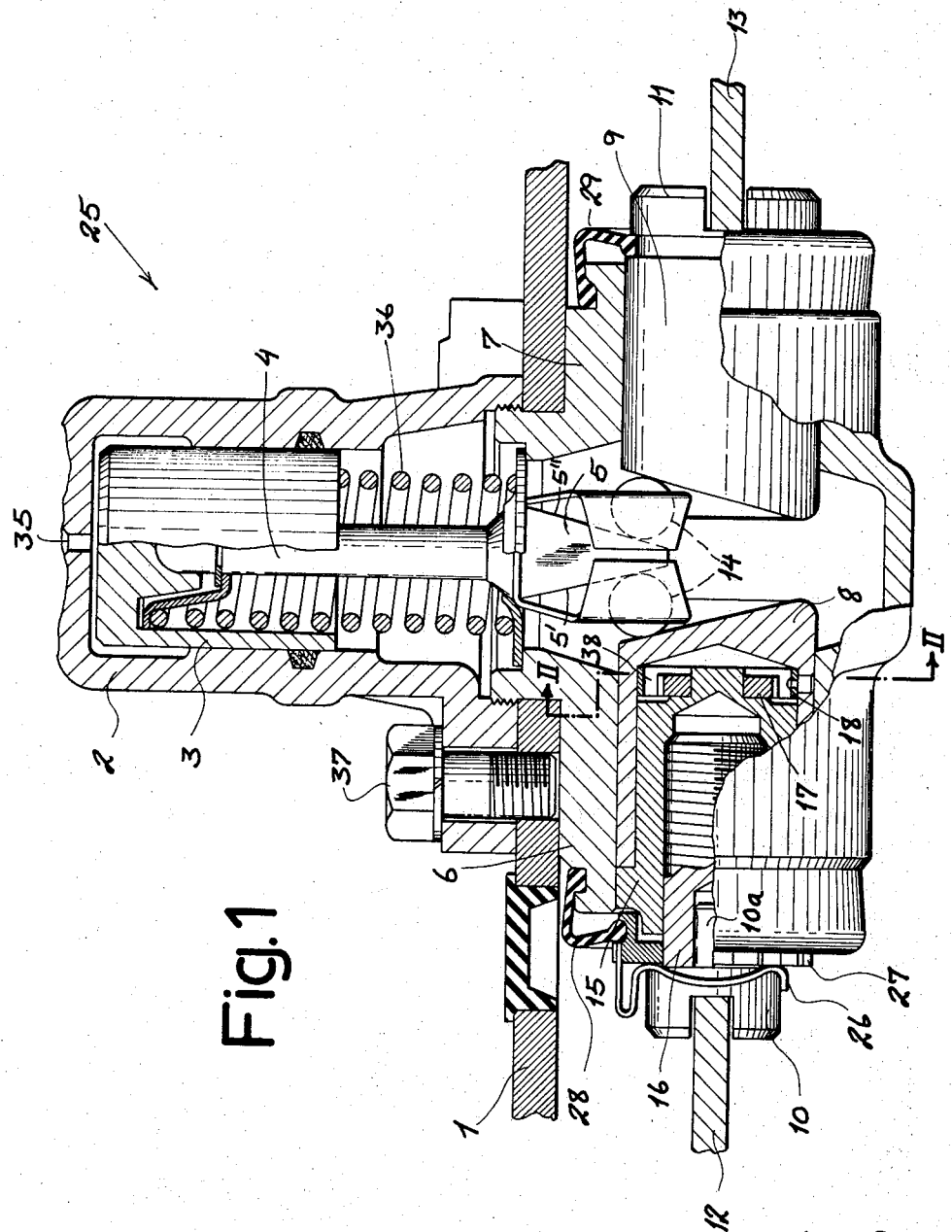
FIG. 1 is a cross-sectional view of a self-adjusting brake-actuating mechanism according to the invention.

Reference will first be made to FIG. 3 for a general description of a representative brake system to which the invention is applicable. The system comprises a rotatable brake drum 30 within which a pair of brake shoes 12, 13 with linings 27, 28 are movably disposed in the usual manner.

Drum 30 is mounted on a wheel shaft 31 which may be one of the axles of an automotive vehicle. The brake shoes 12, 13 are biased toward each other by tension springs 32, 33 and are held separated by a bracing plate 34 and a hydraulic actuating mechanism which comprises a pair of pusher members 10, 11 projecting in opposite directions from a housing 25. A brake shield 1, rigid with drum 30, supports the actuating mechanism which will now be described in detail with reference to FIGS. 1 and 2.

Housing 25 forms a hydraulic cylinder 2 within which a piston 3 is movable, under pressure from a hydraulic fluid admitted at 35, against the force of a restoring spring 36. Piston 3 has a rod 4 terminating in a drive element 5 with two symmetrically declined ramp surfaces 5', 5" confronting the ends of a pair of transverse pistons 8 and 9, these ends being obliquely cut off along planes substantially parallel to surfaces 5', 5" and being separated from these surfaces by rollers 15. The pistons 8, 9 are guided in respective cylinders 6, 7 which together form a housing portion threadedly connected with hydraulic cylinder 2. The left-hand piston 8 (FIG. 1) is hollow and surrounds a sleeve 15 in threaded engagement with a stem 16 terminating in a bifurcate head 10 which straddles the associated brake shoe 12; an extension 11 rigid with piston 9 similarly engages the brake shoe 13. Cylinder 2 is attached to the brake shield 1 by several screws 37 (only one shown).

Head 10 is rotatably connected, by a stud 10a, with stem 16 but is normally immobilized with reference to the stem by a resilient wire 26 secured to head 10. An end of wire 26 rests in a peripheral recess of a cap 27 which is rigid with stem 16 and may be manually rotated, with resilient outward camming of wire 26, to reset the stem 16 to a fully withdrawn starting position, e.g. upon a relining of the brake shoes 12 and 13. Rubber cuffs 28, 29 connect the cap 27 and the piston 9 with cylinders 6 and 7, respectively.

The inner end of sleeve 15 is reduced to form an annular clearance 38 within the surrounding piston 8. Seated within this clearance is a ratchet 17, rigid with sleeve 15, and a flat spring 18 forming a convoluted pawl, one end of this spring being secured at 18a to piston 8 while its other end 18b engages one of the sawteeth of ratchet 17. The peripheral wall of piston 8 has a bore 8a within which a ball 19 is seated; a wedge member 20 is received in an inner peripheral recess of cylinder 6 and has a conical depression 20a into which the ball 19 normally penetrates. When the piston 8 is moved outwardly with reference to cylinder 6, under pressure of the associated drive roller 14, wedge member 20 cams the ball 19 radially inwardly so that the latter pushes upon the spring 18 in the vicinity of its free end 18b, thereby sufficiently deflecting that end to step the ratchet 17 in a counterclockwise direction as viewed in FIG. 2. This direction is so chosen that the threaded stem 16 moves axially outwardly, i.e. to the left in FIG. 1, this motion being irreversible if the extent of the piston stroke and therefore the degree of deflection of spring pawl 18 is sufficient to turn the ratchet 17 by a distance greater than its tooth division. In this manner, repeated actuation of drive piston 3 will progressively step the ratchet 17, and commensurately advance the stem 16 with its head 10, if the lining 27, 28 of either brake shoe 12, 13 is worn far enough to allow the pusher members 10, 11 to separate to a sufficient extent.

Figure 2:
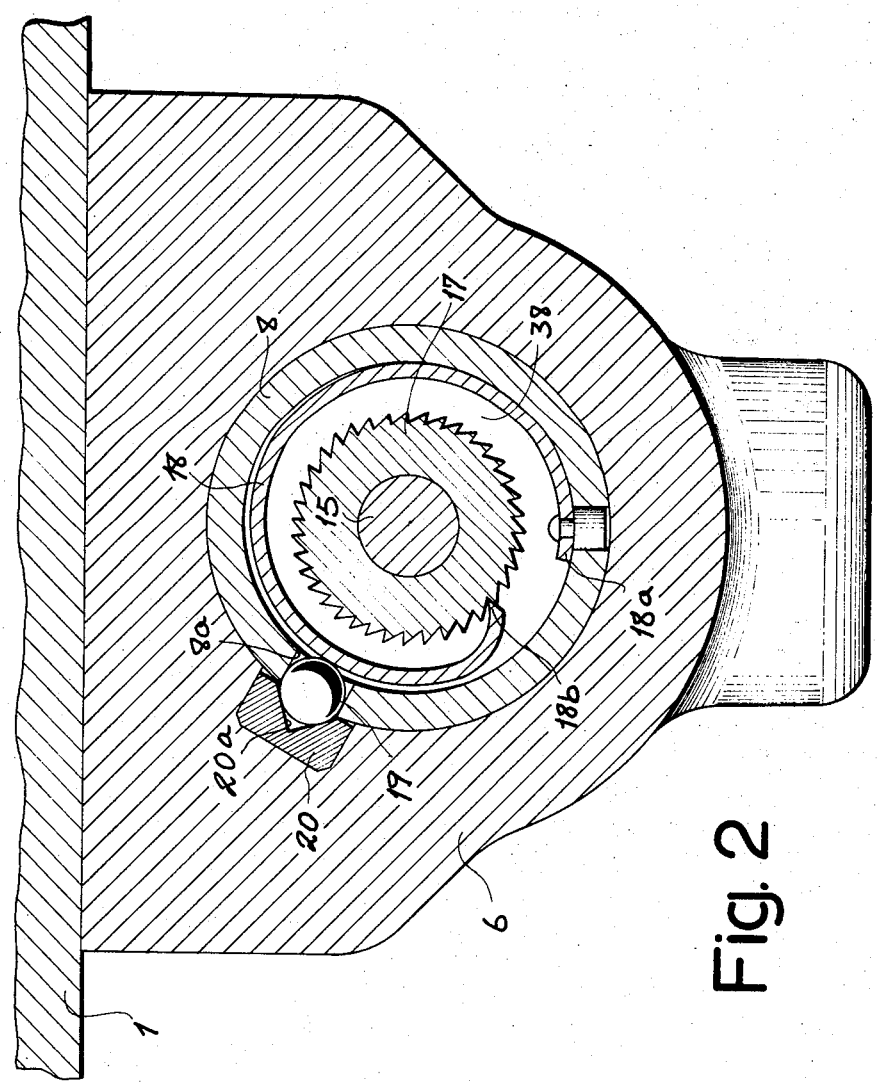
FIG. 2 is a fragmentary sectional view taken on the line II—II of FIG. 1 and drawn to a larger scale.

It will be apparent that the right-hand piston 9 of cylinder 7 in FIG. 1 could also be designed as an extensible assembly similar to that associated with cylinder 6. This and other modifications, readily apparent to persons skilled in the art, are intended to be embraced in the spirit and scope of my invention as defined in the appended claims.

I claim:
1. A fluid-operated brake comprising a guide cylinder, a hollow piston slidably received in said cylinder, fluid-operated drive means for intermittently urging said piston axially outwardly from a normal retracted position, an internally threaded sleeve rotatably lodged in said piston and coupled therewith for outward axial entrainment, an externally threaded stem in mesh with said sleeve, a brake shoe operatively coupled with said stem for displacement thereby in axial direction of said cylinder, said stem being nonrotatably supported on said cylinder with freedom of outward displacement in said axial direction, ratchet means rigid with said sleeve centered on said axis and surrounded with annular clearance by said piston, an elongated resilient pawl in said annular clearance having one end anchored to said piston and having its other end in engagement with said ratchet means, a pressure member on said piston radially bearing upon said pawl in the vicinity of said other end thereof, and cam means on said cylinder cooperating with said pressure member for urging the latter radially inwardly against the resilient force of said pawl in response to outward axial displacement of said piston with reference to said cylinder, said ratchet means having an array of sawteeth so disposed as to impart stepped rotation to said sleeve with consequent outward movement of said stem upon successive camming displacement of said pressure member by a piston motion exceeding a predetermined axial stroke length.

2. A brake as defined in claim 1 wherein said cylinder has a peripheral recess with a slanting bottom representing said camming means, said pressure member being a ball lodged in a peripheral bore of said hollow piston projecting both inwardly and outwardly from the piston wall.

3. A fluid-operated brake comprising a pair of substantially aligned guide cylinders, a hollow piston slidably received in each cylinder, fluid-operated drive means for intermittently urging said pistons axially outwardly and away from each other from a normal retracted position, an internally threaded sleeve rotatably lodged in at least one of pistons and coupled therewith for outward axial entrainment, and externally threaded stem in mesh with said sleeve, a brake shoe operatively coupled with said stem for displacement thereby in axial direction of the associated cylinder, said stem being nonrotatably supported on its cylinder with freedom of outward displacement in said axial direction, ratchet means rigid with said sleeve centered on said axis and surrounded with annular clearance by said one of said pistons, an elongated resilient pawl in said annular clearance having one end anchored to said one of said pistons and having its other end in engagement with said ratchet means, a pressure member on said one of said pistons radially bearing upon said pawl in the vicinity of said other end thereof, and cam means on said associated cylinder cooperating with said pressure member for urging the latter radially inwardly against the resilient force of said pawl in response to outward axial displacement of said one of said pistons with reference to said associated cylinder, said ratchet means having an array of sawteeth so disposed as to impart stepped rotation to said sleeve with consequent outward movement of said stem upon successive camming displacement of said pressure member by a piston motion exceeding a predetermined axial stroke length.

4. A brake as defined in claim 3 wherein said drive means comprises a hydraulic piston movable in a direction generally perpendicular to the axes of said cylinders and wedge means disposed at an end of said hydraulic piston, said hollow pistons being provided with oblique confronting ends engageable by said wedge means.

5. A brake as defined in claim 4 wherein said wedge means comprises a pair of symmetrical ramp members and a pair of rollers respectively interposed between said ramp members and said oblique ends.

References Cited

UNITED STATES PATENTS 3,068,964  12/1962  Williams et al. ____ 188—196 X
3,266,602  8/1966   Belart et al. _____ 188—79.5 X DUANE A. REGER, *Primary Examiner.*